United States Patent
Yoshizawa

(10) Patent No.: US 9,443,493 B2
(45) Date of Patent: Sep. 13, 2016

(54) GRAPH DISPLAY CONTROL APPARATUS, GRAPH DISPLAY CONTROL METHOD AND NON-TRANSITORY STORAGE MEDIUM HAVING STORED THEREON GRAPH DISPLAY CONTROL PROGRAM

(71) Applicant: CASIO COMPUTER CO., LTD., Shibuya-ku, Tokyo (JP)

(72) Inventor: Hiroaki Yoshizawa, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 81 days.

(21) Appl. No.: 14/218,773

(22) Filed: Mar. 18, 2014

(65) Prior Publication Data
US 2014/0285528 A1 Sep. 25, 2014

(30) Foreign Application Priority Data

Mar. 21, 2013 (JP) ................. 2013-057561

(51) Int. Cl.
*G09G 5/00* (2006.01)
*G09G 5/37* (2006.01)
(Continued)

(52) U.S. Cl.
CPC ............. *G09G 5/37* (2013.01); *G06F 3/04812* (2013.01); *G06T 3/00* (2013.01); *G06T 11/60* (2013.01)

(58) Field of Classification Search
CPC .......... G06T 11/206; G06T 2207/20072; G06T 11/001; G06T 11/60; G06T 3/00; G06T 11/20; G06F 15/0225; G06F 9/455; G06F 3/0484; G06F 3/0481; G06F 3/04812; G09B 19/025; G09B 19/0053; G09B 23/02; G09B 5/00; G09B 5/02; G09B 19/02; G09G 5/37
See application file for complete search history.

(56) References Cited

U.S. PATENT DOCUMENTS 4,794,553 A * 12/1988 Watanabe ........... G06F 15/0225
345/440
4,794,554 A * 12/1988 Tamiya ............... G06F 3/04845
345/440
(Continued)

FOREIGN PATENT DOCUMENTS

JP      09-282476 A     10/1997
JP      11-161612 A      6/1999
JP      2011-039689 A    2/2011

OTHER PUBLICATIONS

Maysutaka, (JP11161612) Electronic Appliance, Jun. 18, 1999, WIPO.*

(Continued)

*Primary Examiner* — Devona Faulk
*Assistant Examiner* — Charles L Beard
(74) *Attorney, Agent, or Firm* — Holtz, Holtz & Volek PC

(57) ABSTRACT

A graph display control apparatus includes a figure display control unit, a graph figure change unit, a coordinate value calculation unit and a figure prominent display control unit. The figure display control unit sets a coordinate system to a display unit and displays (i) a first graph figure and (ii) a coordinate axis or a second graph figure in the system. The graph figure change unit moves or transforms the first graph figure in the system in response to a user operation to change the first graph figure. The coordinate value calculation unit detects an intersection point of (i) the changed first graph figure and (ii) the coordinate axis or the second graph figure and calculates a coordinate value of the intersection point. The figure prominent display control unit prominently displays the changed first graph figure when the coordinate value is an integer.

22 Claims, 7 Drawing Sheets

(51) Int. Cl.
*G06T 11/60* (2006.01)
*G06F 3/0481* (2013.01)
*G06T 3/00* (2006.01)

(56) References Cited

U.S. PATENT DOCUMENTS

| | | | | |
|---|---|---|---|---|
| 4,908,786 A * | 3/1990 | Kuno | G06F 15/0225 | 345/440 |
| 5,303,338 A * | 4/1994 | Handa | G06F 15/0225 | 345/440 |
| 5,461,708 A * | 10/1995 | Kahn | G06T 11/206 | 345/440 |
| 5,535,317 A * | 7/1996 | Tanaka | G06F 15/025 | 5/25 |
| 5,557,718 A * | 9/1996 | Tsuneyoshi | G06T 11/206 | 345/440 |
| 5,588,108 A * | 12/1996 | Kumar | G06F 3/04845 | 715/765 |
| 5,712,656 A * | 1/1998 | Ikeda | G06F 3/04845 | 345/440 |
| 5,739,823 A * | 4/1998 | Akaza | G09G 1/162 | 345/440 |
| 5,825,001 A * | 10/1998 | Oba | G06F 15/0225 | 235/85 R |
| 5,907,317 A * | 5/1999 | Tanaka | G06F 3/0489 | 324/121 R |
| 6,002,399 A * | 12/1999 | Haine | G06T 11/206 | 715/763 |
| 6,133,924 A * | 10/2000 | Ito | G06T 11/206 | 345/440 |
| 6,771,252 B2 * | 8/2004 | Miller | G06T 11/206 | 345/158 |
| 6,795,838 B1 * | 9/2004 | Kataoka | G06F 17/215 | 382/187 |
| 6,831,646 B1 * | 12/2004 | Cottrille | G06T 11/206 | 345/473 |
| 6,867,777 B2 * | 3/2005 | Miller | G06F 15/0275 | 345/440 |
| 7,574,465 B2 * | 8/2009 | Yu | G06F 17/10 | 708/174 |
| 7,942,675 B1 * | 5/2011 | Errthum | G09B 23/02 | 434/211 |
| 7,995,063 B2 * | 8/2011 | Nakamura | G06T 11/203 | 345/441 |
| 8,259,115 B2 * | 9/2012 | Okano | G06F 15/0225 | 345/440 |
| 8,332,445 B2 * | 12/2012 | Gotoh | G06F 15/02 | 708/130 |
| 8,514,227 B2 * | 8/2013 | Matsuda | G06F 15/0225 | 345/440 |
| 8,542,254 B2 * | 9/2013 | Okano | G06T 11/206 | 345/440 |
| 8,576,230 B2 * | 11/2013 | Okano | G06F 15/02 | 345/440 |
| 8,749,553 B1 * | 6/2014 | Krasovsky | G06T 11/203 | 345/440 |
| 9,047,707 B2 * | 6/2015 | Kai | G06T 11/206 | |
| 2002/0067357 A1 * | 6/2002 | Hosea | G06T 11/206 | 345/440 |
| 2002/0075227 A1 * | 6/2002 | Miller | G06F 15/0275 | 345/156 |
| 2002/0075265 A1 * | 6/2002 | Miller | G06T 11/206 | 345/440 |
| 2004/0083247 A1 * | 4/2004 | Koont | G06F 15/0225 | 708/160 |
| 2004/0227738 A1 * | 11/2004 | Sudoh | G06F 3/0481 | 345/173 |
| 2005/0033784 A1 * | 2/2005 | de Brebisson | G06F 15/0225 | 708/160 |
| 2005/0041017 A1 * | 2/2005 | de Brebisson | G06T 11/206 | 345/169 |
| 2006/0131415 A1 * | 6/2006 | Irons | G06F 3/038 | 235/454 |
| 2006/0253534 A1 * | 11/2006 | Milheron | G09B 23/02 | 709/205 |
| 2007/0035514 A1 * | 2/2007 | Kubo | G06T 11/203 | 345/157 |
| 2007/0046674 A1 * | 3/2007 | Sudoh | G06F 3/0481 | 345/440 |
| 2007/0050432 A1 * | 3/2007 | Yoshizawa | G06F 15/16 | 708/130 |
| 2007/0225955 A1 * | 9/2007 | Yamaguchi | G06F 17/5009 | 703/9 |
| 2008/0062177 A1 * | 3/2008 | Gaul | G06T 11/203 | 345/440 |
| 2008/0136821 A1 * | 6/2008 | Okano | G06T 11/206 | 345/440 |
| 2009/0085917 A1 * | 4/2009 | Fuller | G06T 11/206 | 345/440.1 |
| 2009/0254597 A1 * | 10/2009 | Karoji | G09B 19/025 | 708/130 |
| 2009/0307587 A1 * | 12/2009 | Kaneko | G06F 3/0486 | 715/700 |
| 2010/0083161 A1 * | 4/2010 | Yoshizawa | G06F 9/44 | 715/773 |
| 2010/0134261 A1 * | 6/2010 | Heimendinger | G06F 3/016 | 340/407.1 |
| 2010/0188427 A1 * | 7/2010 | Chuang | G06Q 10/00 | 345/660 |
| 2010/0225649 A1 * | 9/2010 | Okano | G06T 11/206 | 345/440 |
| 2010/0231596 A1 * | 9/2010 | Matsuda | G06F 15/0225 | 345/440 |
| 2010/0254623 A1 * | 10/2010 | Yu | G06T 5/009 | 382/274 |
| 2011/0016165 A1 * | 1/2011 | Uejima | G06F 15/0225 | 708/141 |
| 2011/0090227 A1 * | 4/2011 | De Brebisson | G06F 3/04812 | 345/440 |
| 2011/0234596 A1 * | 9/2011 | Okano | G06F 15/02 | 345/440 |
| 2011/0234624 A1 * | 9/2011 | Akaza | G06T 11/206 | 345/593 |
| 2011/0254857 A1 * | 10/2011 | Sakurai | G06T 11/203 | 345/629 |
| 2011/0254862 A1 * | 10/2011 | Okano | G06F 15/0225 | 345/634 |
| 2012/0242690 A1 * | 9/2012 | Yamaguchi | G06F 15/0216 | 345/629 |
| 2013/0113824 A1 * | 5/2013 | Kai | G06T 11/206 | 345/629 |
| 2013/0266916 A1 * | 10/2013 | Weems | G09B 5/02 | 434/188 |
| 2014/0092094 A1 * | 4/2014 | Itoh | G06T 11/206 | 345/440 |
| 2014/0300604 A1 * | 10/2014 | Pimmel | G06T 11/60 | 345/440 |
| 2014/0317570 A1 * | 10/2014 | Endo | G06F 3/04847 | 715/825 |
| 2015/0160838 A1 * | 6/2015 | Shirabe | G06F 3/04845 | 715/765 |
| 2015/0161338 A1 * | 6/2015 | Scherrer | G06F 19/325 | 705/2 |
| 2015/0310646 A1 * | 10/2015 | Karoji | G06T 11/206 | 345/440 |

OTHER PUBLICATIONS

Student Software Guide Book of "TI-Nspire CX CAS", 2011.

* cited by examiner

GRAPH DISPLAY CONTROL APPARATUS, GRAPH DISPLAY CONTROL METHOD AND NON-TRANSITORY STORAGE MEDIUM HAVING STORED THEREON GRAPH DISPLAY CONTROL PROGRAM

CROSS REFERENCE TO RELATED APPLICATION

This application is based upon and claims the benefit of priority under 35 U.S.C. 119 of Japanese Patent Application No. 2013-057561 filed on Mar. 21, 2013, the entire disclosure of which, including the description, claims, drawings and abstract, is incorporated herein by reference in its entirety.

BACKGROUND OF THE INVENTION

1. Field of the Invention

The present invention relates to a graph display control apparatus, a graph display control method and a non-transitory storage medium having stored thereon a graph display control program.

2. Description of the Related Art

In a situation where a graph of a function formula is studied, there is a time when characteristics of the graph would like to be found by moving the graph in a coordinate system.

Therefore, these days, a graph display apparatus such as a graph scientific calculator displays grid lines on a display screen in such a way that the grid lines align with gradations of coordinate axes, moves a graph in response to a user operation in such a way that a specific point on the graph specified through a touch operation or the like matches a crossing position of the grid lines and updates a graph formula of the graph to be displayed, which is described, for example, in Japanese Patent Application Laid-Open Publication No. 2011-039689. With this art, a graph is moved and the characteristics of the graph can be studied in relation to coordinates of a specific point.

BRIEF SUMMARY OF THE INVENTION

However, the art is made without giving consideration to intersection points of a graph and another figure being specific points, and consequently a graph cannot be moved in such a way that the intersection points match crossing positions of grid lines. Further, the art is made without giving consideration to a graph being transformed, and consequently a graph cannot be transformed in such a way that intersection points of the graph and another figure match crossing positions of grid lines.

Therefore, with the conventional art, it is impossible to move or transform a graph and study the graph in relation to coordinates of intersection points of the graph and another figure.

Objects of the present invention include providing a graph display control apparatus, a graph display control method and a non-transitory storage medium having stored thereon a graph display control program each of which moves or transforms a graph so that the graph can be studied in relation to coordinates of intersection points of the graph and another figure.

In order to achieve at least one of the objects, according to an aspect of the present invention, there is provided a graph display control apparatus including: a display unit; a figure display control unit which sets a coordinate system to the display unit and displays (i) a first graph figure and (ii) a coordinate axis or a second graph figure in the coordinate system on the display unit; a graph figure change unit which moves or transforms the first graph figure in the coordinate system in response to a user operation so as to change the first graph figure; a coordinate value calculation unit which detects an intersection point of (i) the changed first graph figure and (ii) the coordinate axis or the second graph figure as a coordinate calculation intersection point and calculates a coordinate value of the coordinate calculation intersection point; and a figure prominent display control unit which prominently displays the changed first graph figure on the display unit when the calculated coordinate value is an integer.

BRIEF DESCRIPTION OF THE DRAWINGS

The present invention will be more fully understood from the detailed description given hereinafter and the appended drawings, which are given by way of illustration only, and thus are not intended as a definition of the limits of the present invention, wherein.

DETAILED DESCRIPTION OF THE INVENTION

In the following, an embodiment of the present invention is described in detail with reference to the attached drawings. However, the scope of the present invention is not limited thereto.

1. External Configuration

Figure 1A:
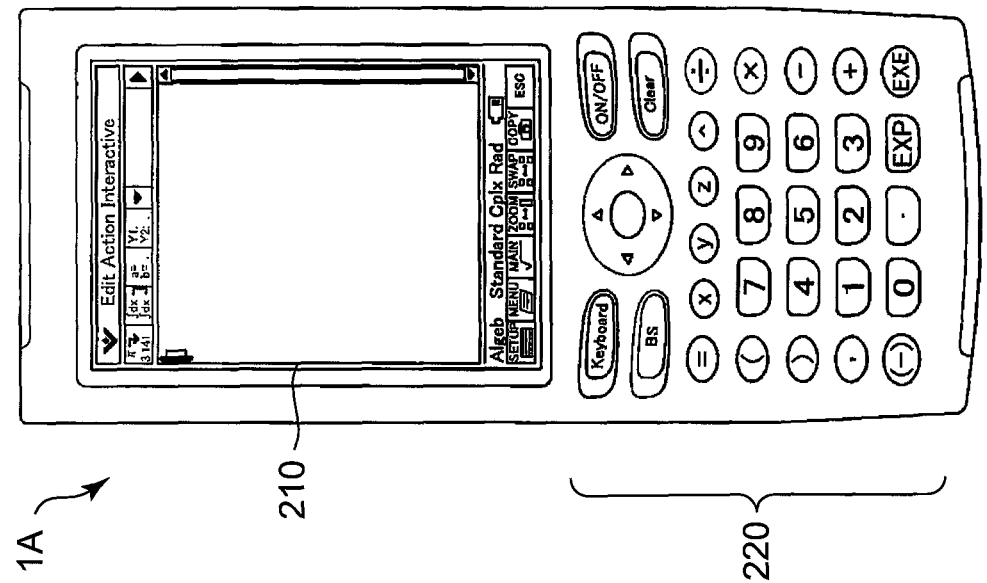
FIG. 1A is a plan view of a graph display apparatus.

FIG. 1A is a plan view of a graph display apparatus 1 according to the embodiment.

As shown in FIG. 1A, the graph display apparatus 1 includes a display 210 and a key set 220.

The display 210 displays thereon various data such as letters and symbols corresponding to user operations on the key set 220 and constituted of an LCD (Liquid Crystal Display), an ELD (Electronic Luminescence Display) or the like. The display 210 of the embodiment is integrally formed with a touch panel 221 (FIG. 2) and can receive operations, for example, through handwriting input.

The key set 220 includes various keys to receive user operations.

2. Functional Configuration

Figure 2:
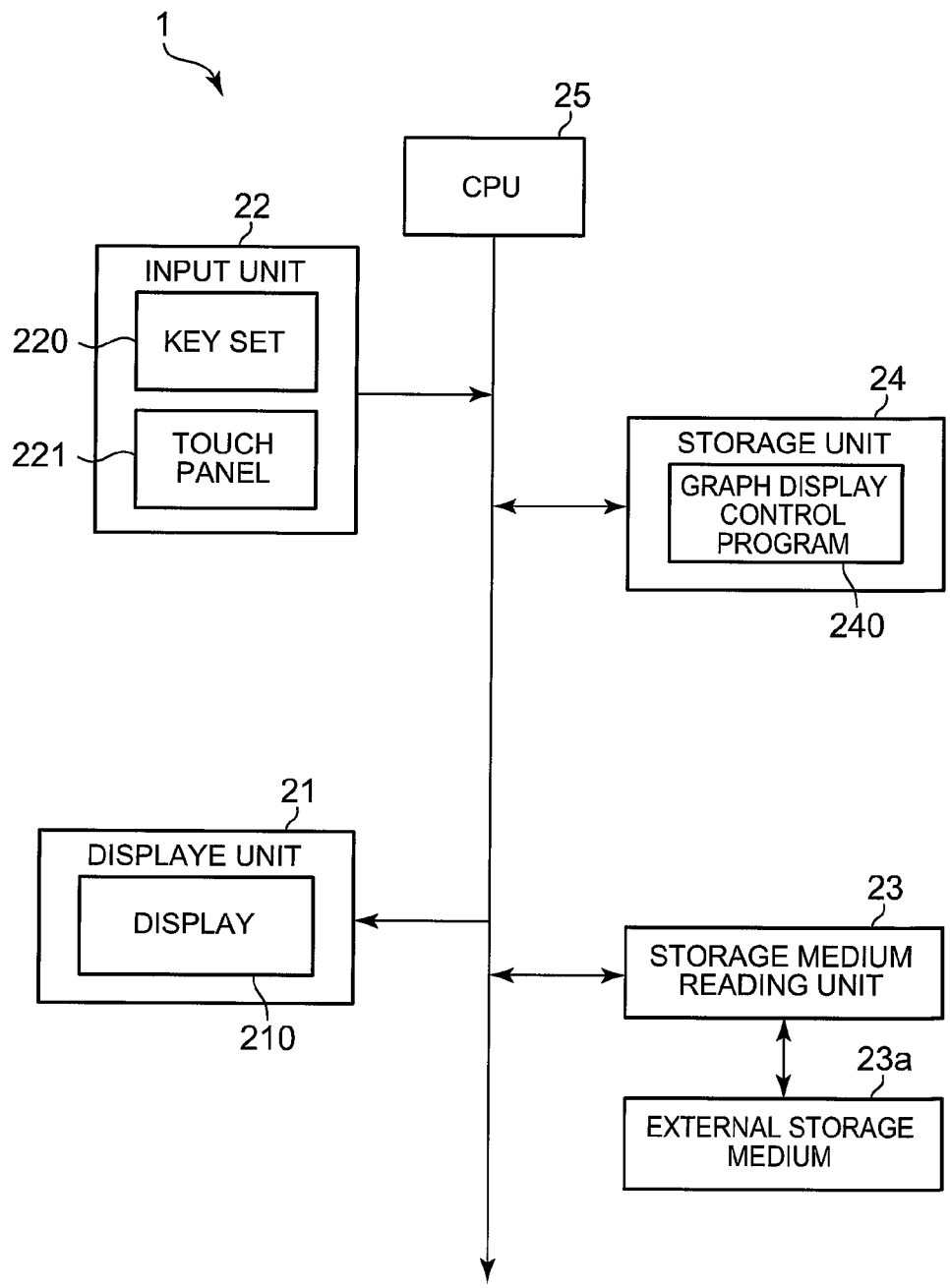
FIG. 2 is a block diagram showing the functional configuration of the graph display apparatus.

FIG. 2 is a block diagram showing the functional configuration of the graph display apparatus 1 of the embodiment.

As shown in FIG. 2, the graph display apparatus 1 includes a display unit 21, an input unit 22, a storage medium reading unit 23, a storage unit 24 and a CPU 25.

The display unit 21 includes the display 210, and various pieces of information are displayed on the display 210 in response to display signals input from the CPU 25.

The input unit 22 includes the key set 220 and the touch panel 221 and outputs signals corresponding to types of pressed keys or touch points on the touch panel 221 to the CPU 25.

The storage medium reading unit 23 reads information from an external storage medium 23a such as an SD card and also stores information in the external storage medium 23a.

The storage unit 24 is a memory which stores therein programs and data to realize various functions of the graph display apparatus 1 and functions as a work area for the CPU 25. In the embodiment, the storage unit 24 stores therein a graph display control program 240 and the like of the present invention.

The graph display control program 240 is a program for the CPU 25 to perform a graph display control process (FIG. 3) described below.

The CPU 25 performs centralized-control on the components of the graph display apparatus 1. More specifically, the CPU 25 opens a system program stored in the storage unit 24 and a program(s) specified from various application programs stored in the storage unit 24. Thus, the CPU 25 performs various processes by working with opened programs.

3. Action

Next, action of the graph display apparatus 1 is described with reference to the drawings.

Figure 3:
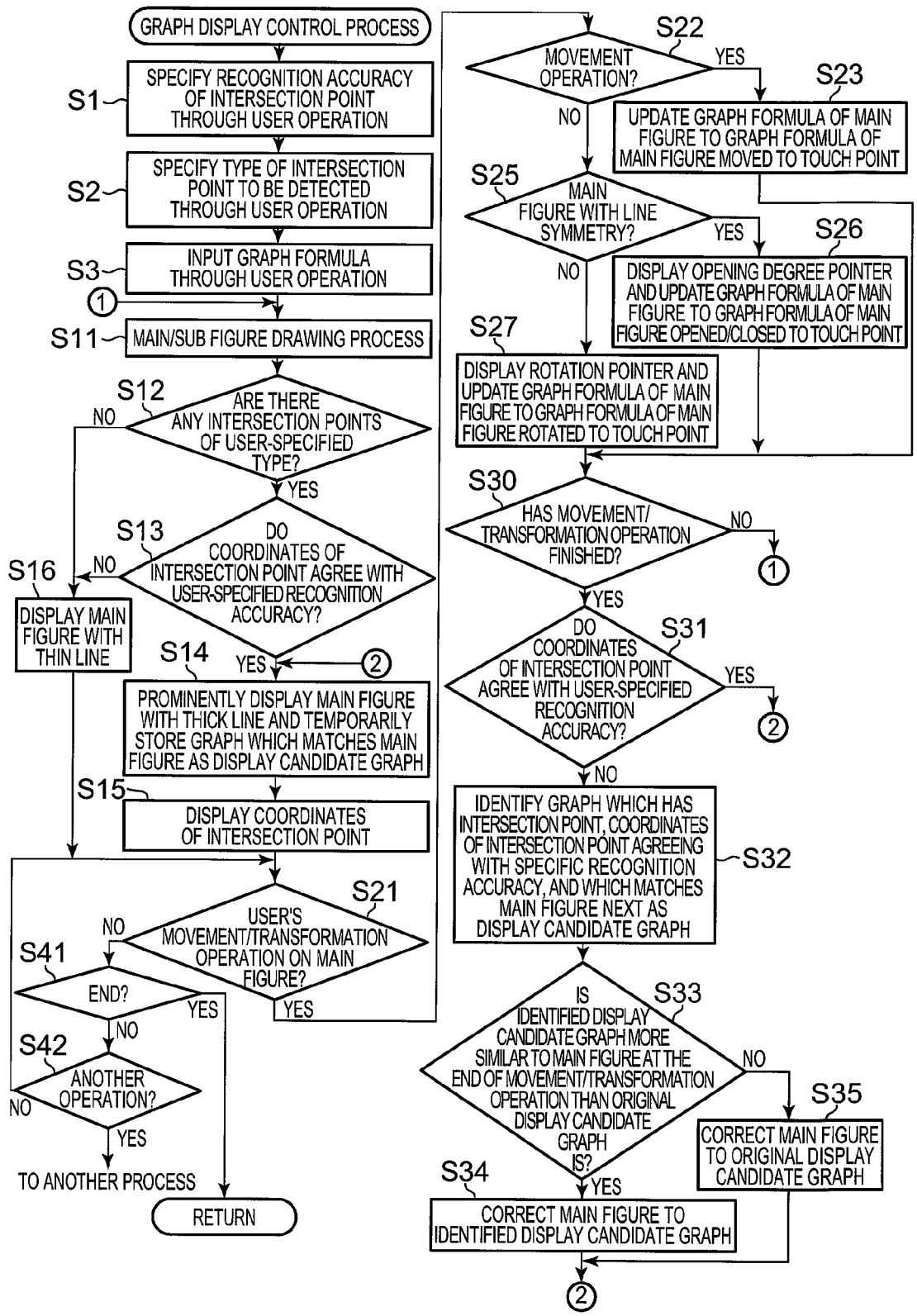
FIG. 3 is a flowchart of a graph display control process.

FIG. 3 is a flowchart to explain actions of the graph display control process performed by the graph display apparatus 1. The graph display control process is performed by the CPU 25 and the graph display control program 240 working together. More specifically, when a user inputs a command to execute the graph display control process through the input unit 22, the CPU 25 reads the graph display control program 240 from the storage unit 24 and appropriately opens the read graph display control program 240 so as to perform the graph display control process.

As shown in FIG. 3, in the graph display control process, first, the CPU 25 specifies through a user operation one of "integer", "n decimal place(s) (i.e. $n^{th}$ decimal place)" and "any" as recognition accuracy of coordinate values of intersection points (coordinate calculation intersection points, hereinafter) K (FIG. 4B) of a main figure Z1 and a sub figure Z2 described below (Step S1). The recognition accuracy indicates accuracy which coordinate values should satisfy to be recognized as a display target. More specifically, when the recognition accuracy is "integer", coordinate values of a coordinate calculation intersection point K are recognized as the display target if the coordinate values are expressed as true values in integers; when the recognition accuracy is "n decimal place(s)" (wherein "n" is a natural number specified by a user), coordinate values of a coordinate calculation intersection point K are recognized as the display target if the coordinate values are decimals expressed to the $n^{th}$ decimal place as true values (that is, if the coordinate values are expressed as true values in decimals of n decimal place(s) or less); and when the recognition accuracy is "any", coordinate values of a coordinate calculation intersection point K are always recognized as the display target.

Note that when the accuracy recognition is "n decimal place(s)", coordinate values of a coordinate calculation intersection point K are recognized as the display target if the coordinate values are expressed in decimals of n decimal place(s) or less or in integers. For example, when the recognition accuracy is set to "one decimal place", not only a decimal such as "1.9" or "2.1" but also an integer such as "2" is recognized as the display target. In the embodiment, when both the x coordinate value and the y coordinate value are integers or decimals of n decimal place(s) specified or less, the coordinate values are recognized as the display target. Alternatively, when at least one of the x coordinate value and the y coordinate value is an integer or a decimal of n decimal place(s) specified or less, the coordinate values may be recognized as the display target. Further, as the recognition accuracy, "last n digit(s) or more of an integer is zero" may be set. For example, when the recognition accuracy is set to be "last two digits or more of an integer are zero", "900", "1000", "1200" and the like are recognized as the display target, but "901", "910" and the like are not recognized as the display target. Further, the recognition accuracy may be set according to a scale span used for graph display. For example, when the scale span of each of x and y is "0.5", coordinate values expressed as true values in units of "0.5" such as "3.5", "4" and "4.5" are recognized as the display target.

Next, the CPU 25 specifies through a user operation a type of intersection points (coordinate calculation intersection points K) to be detected (Step S2). Examples of the type of intersection points include intersection points of a function graph figure and another function graph figure and intersection points of a function graph figure and a coordinate axis.

Next, the CPU 25 inputs at least one graph formula (function formula) through a user operation (Step S3).

Next, the CPU 25 sets a coordinate system (Cartesian coordinate system defined by an X axis and a y axis in the embodiment) into a display screen of the display 210 and displays (draws) the graph figure (function graph figure) of the input graph formula in the coordinate system (Step S11). When only one graph formula is input at Step S3, the CPU 25 sets the graph figure of the graph formula as the main figure Z1 at Step S11. Alternatively, when a plurality of graph formulas are input at Step S3, the CPU 25 sets the graph figure of one graph formula among the graph formulas as the main figure Z1 at Step S11. Further, when the type of coordinate calculation intersection points K specified at Step S2 is intersection points of a function graph (function graph figure or graph figure) and another function graph ("Function" in FIGS. 5A and 6A), the CPU 25 sets the graph figure of another graph formula, which is different from that of the main figure Z1, among the graph formulas as the sub figure Z2 at Step S11. On the other hand, when the type of coordinate calculation intersection points K specified at Step S2 is intersection points of a function graph and a coordinate axis ("X axis" or "Y axis" in FIGS. 5A and 6A), the CPU 25 sets a coordinate axis (the x axis or the y axis) as the sub figure Z2 at Step S11. Consequently, when a plurality of graph figures different from the main figure Z1 are displayed on the display 210, a graph figure among the plurality of graph figures is specified through a user operation as the sub figure Z2.

Next, the CPU 25 detects any coordinate calculation intersection points K, the type of which is specified at Step S2, namely, any intersection points of the main figure Z1 and the sub figure Z2, thereby determining whether or not there are any coordinate calculation intersection points K (Step S12).

When determining that there are no coordinate calculation intersection points K (Step S12; NO), the CPU 25 moves to Step S16 described below.

On the other hand, when determining that there is at least one coordinate calculation intersection point K (Step S12; YES), the CPU 25 determines whether or not coordinate values of the coordinate calculation intersection point K agree with the recognition accuracy (specific recognition accuracy, hereinafter) specified at Step S1 (Step S13). In other words, the CPU 25 determines at Step S13 whether or not coordinate values of the coordinate calculation intersection point K are expressed as true values in integers when the specific recognition accuracy is "integer" or determines whether or not coordinate values of the coordinate calculation intersection point K are expressed as true values in decimals of n decimal place (s) or less when the specific recognition accuracy is "n decimal place(s)". When the specific recognition accuracy is "any", coordinate values of the coordinate calculation intersection point K agree with the specific recognition accuracy with no condition.

When determining that coordinate values of the coordinate calculation intersection point K do not agree with the specific recognition accuracy (Step S13; NO), the CPU 25 displays the main figure Z1 in a normal display mode (with a thin line in the embodiment) (Step S16) and then moves to Step S21.

On the other hand, when determining that coordinate values of the coordinate calculation intersection point K agree with the specific recognition accuracy (Step S13; YES), the CPU 25 prominently displays the main figure Z1 with a thick line and temporarily stores the graph figure which matches the current main figure Z1 (the graph figure representing the current main figure Z1) as a display candidate graph figure in the storage unit 24 (Step S14). Note that a graph figure being stored means that the shape and/or the graph formula of the graph figure are stored.

Next, the CPU 25 displays the coordinate values of the coordinate calculation intersection point K near the coordinate calculation intersection point K (Step S15) and determines whether or not a movement/transformation operation is performed on the main figure Z1 (Step S21).

In the embodiment, a movement operation of the main figure Z1 is performed by specifying the main figure Z1 through a touch operation and then performing a drag-and-drop operation on the main figure Z1, whereby the main figure Z1 is moved in a direction (drag direction, hereinafter) indicated through the drag-and-drop operation.

Further, in the embodiment, a pointer P is displayed on the display 210 in response to a predetermined user operation, and the shape of the pointer P is changed to a shape which represents a mode of transformation to be performed on the main figure Z1. A transformation operation of the main figure Z1 is performed by specifying a certain point on the main figure Z1 using the pointer P, the shape of which has been changed, and then performing a drag-and-drop operation on the main figure Z1, whereby the main figure Z1 is transformed in the drag direction indicated through the drag-and-drop operation.

If the main figure Z1 is line symmetry (axial symmetry), the main figure Z1 can be transformed in such a way that opening degree of the main figure Z1 with respect to the axis of symmetry changes. In this case, the shape of the pointer P (FIG. 5B) represents that the opening degree is changeable.

If the main figure Z1 is not line symmetry, the main figure Z1 can be transformed in such a way that the main figure Z1 rotates on a certain point, which is a rotation center, on the main figure Z1. In this case, the shape of the pointer P (FIG. 6B) represents that the figure is rotatable.

When determining that a movement/transformation operation is performed on the main figure Z1 (Step S21; YES), the CPU 25 determines whether or not the movement/transformation operation is a movement operation (Step S22).

When determining that the movement/transformation operation is a movement operation (Step S22; YES), the CPU 25 calculates the graph formula of the main figure Z1 moved (translated) in a direction (drag direction) indicated through the movement operation to the current touch point touched by the user, updates the displayed graph formula of the main figure Z1 on the display 210 to the calculated graph formula (Step S23) and then moves to Step S30.

On the other hand, when determining that the movement/transformation operation is not a movement operation (Step S22; NO), the CPU 25 determines whether or not the main figure Z1 is line symmetry (Step S25).

When determining that the main figure Z1 is line symmetry (Step S25; YES), the CPU 25 changes the shape of the pointer P to the shape which represents that the opening degree is changeable, calculates the graph formula of the main figure Z1 opened/closed in response to a user operation (drag-and-drop operation or transformation operation) using the pointer P (opening degree pointer Ph (FIG. 5B), hereinafter), the shape of which has been changed, to the current touch point touched by the user and updates the displayed graph formula of the main figure Z1 on the display 210 to the calculated graph formula (Step S26) and then moves to Step S30.

On the other hand, when determining that the main figure Z1 is not line symmetry (Step S25; NO), the CPU 25 changes the shape of the pointer P to the shape which represents that the figure is rotatable, calculates the graph formula of the main figure Z1 rotated in response to a user operation (drag-and-drop operation or transformation operation) using the pointer P (rotation pointer Pk (FIG. 6B), hereinafter), the shape of which has been changed, to the current touch point touched by the user and updates the displayed graph formula of the main figure Z1 on the display 210 to the calculated graph formula (Step S27).

Next, the CPI 25 determines whether or not the movement/transformation operation on the main figure Z1 has finished, namely, whether or not touch on the display 210 has finished (Step S30). When determining that the movement/transformation operation on the main figure Z1 has not finished yet (Step S30; NO), the CPU 25 moves to Step S11. Consequently, the main figure Z1 is redrawn on the basis of the graph formula updated at Step S23, S26 or S27, whereby the main figure Z1 is moved or transformed in the coordinate system.

On the other hand, when determining that the movement/transformation operation on the main figure Z1 has finished (Step S30; YES), the CPU 25 determines, in the same manner as that of Step S13, whether or not coordinate values of a coordinate calculation intersection point (s) K agree with the specific recognition accuracy (Step S31).

When determining that coordinate values of the coordinate calculation intersection point K agree with the specific recognition accuracy (Step S31; YES), the CPU 25 displays the graph figure of the graph formula on the display 210 and then moves to Step S14. Consequently, the main figure Z1 is redrawn on the basis of the graph formula updated at Step S23, S26 or S27, whereby the main figure Z1 is moved or transformed in the coordinate system and prominently displayed with a thick line.

On the other hand, when determining that coordinate values of the coordinate calculation intersection point K do not agree with the specific recognition accuracy (Step S31; NO), the CPU 25 identifies, among a plurality of graph figures which match the main figure Z1 when the main figure Z1 continues to be moved or transformed, the graph figure which has an intersection point(s) with the sub figure Z2, coordinate values of the intersection point agreeing with the specific recognition accuracy, and which matches the main figure Z1 immediately after the end of the movement/transformation operation as a display candidate graph figure (Step S32).

Next, the CPU 25 determines whether or not the display candidate graph figure identified at Step S32 is more similar to the main figure Z1 at the end of the movement/transformation operation than the display candidate graph figure temporarily stored at Step S14 is (Step S33). A display candidate graph figure being similar to the main figure Z1 means that the distance between the display candidate graph figure and the main figure Z1 is short in the case where movement operations have been performed on the main figure Z1 and means that the display candidate graph figure and the main figure Z1 resemble each other in shape in the case where transformations operation have been performed on the main figure Z1.

When determining that the display candidate graph figure identified at Step S32 is more similar to the main figure Z1 at the end of the movement/transformation operation (Step S33; YES), the CPU 25 matches the main figure Z1 with the graph figure of this display candidate graph figure, calculates the graph formula of the display candidate graph figure and updates the displayed graph formula of the main figure Z1 on the display 210 to the calculated graph formula (Step S34) and then moves to Step S14. Through Step S34, in the case where the coordinate values of the coordinate calculation intersection point K at the end of the movement/transformation operation do not agree with the specific recognition accuracy, among a plurality of graph figures which match the main figure Z1 when the main figure Z1 continues to be moved or transformed, the graph figure which has an intersection point (s) with the sub figure Z2, coordinate values of the intersection point agreeing with the specific recognition accuracy, and which is most similar to the main figure Z1 at the end of the movement/transformation operation is identified, the main figure Z1 is automatically moved or transformed to match the identified graph figure, and the main figure Z1 moved or transformed is prominently displayed with a thick line.

On the other hand, when determining that the display candidate graph figure temporarily stored at Step S14 is more similar to the main figure Z1 at the end of the movement/transformation operation (Step S33; NO), the CPU 25 matches the main figure Z1 with the graph figure of this display candidate graph figure, calculates the graph formula of the display candidate graph figure and updates the displayed graph formula of the main figure Z1 on the display 210 to the calculated graph formula (Step S35) and then moves to Step S14. Through Step S35, in the case where the coordinate values of the coordinate calculation intersection point K at the end of the movement/transformation operation do not agree with the specific recognition accuracy, among a plurality of graph figures which match the main figure Z1 when the main figure Z1 continues to be moved or transformed, the graph figure which has an intersection point(s) with the sub figure Z2, coordinate values of the intersection point agreeing with the specific recognition accuracy, and which is most similar to the main figure Z1 at the end of the movement/transformation operation is identified, the main figure Z1 is automatically moved or transformed to match the identified graph figure, and the main figure Z1 moved or transformed is prominently displayed with a thick line.

When determining at Step S21 that no movement/transformation operation is performed on the main figure Z1 (Step S21; NO), the CPU 25 determines whether or not an end operation is performed (Step S41).

When determining that an end operation is performed (Step S41; YES), the CPU 25 ends the graph display control process.

On the other hand, when determining that an end operation is not performed (Step S41; NO), the CPU 25 determines whether or not another operation is performed (Step S42).

When determining that another operation is performed (Step S42; YES), the CPU 25 moves to another process. On the other hand, when determining that another operation is not performed (Step S42; NO), the CPU 25 moves to Step S21.

4. Action Examples

Next, the above-described action of the graph display apparatus 1 is described in detail with reference to the drawings.

4.1. First Action Example

Figure 4A:
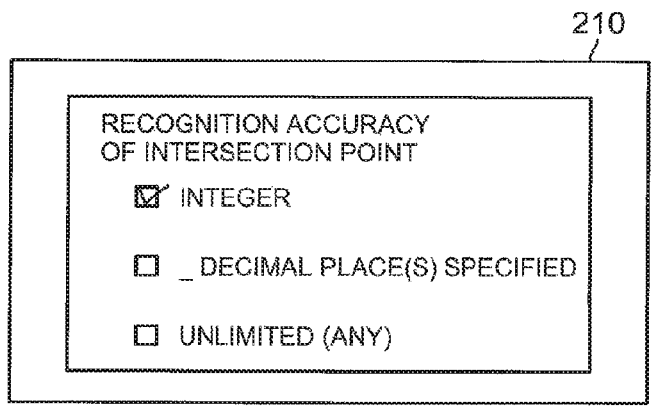
FIGS. 4A to 4E each show display content on a display.
Figure 4B:
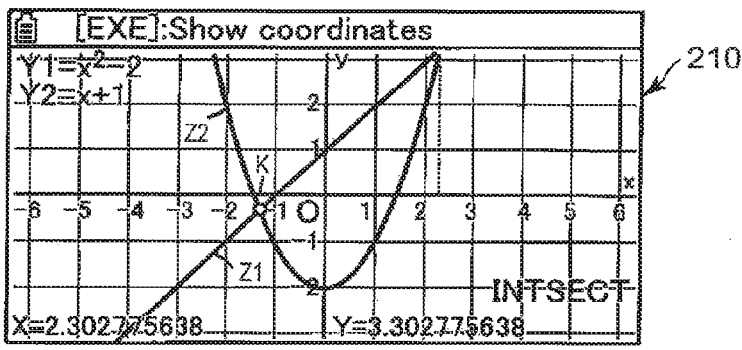

First, as shown in FIGS. 4A and 4B, when a user specifies "integer" as the recognition accuracy of coordinate values of coordinate calculation intersection points K (Step S1), specifies intersection points of a function graph figure and another function graph figure as the type of coordinate calculation intersection points K (Step S2) and inputs graph formulas "$y=x^2-2$" and "$y=x+1$" (Step S3), an xy coordinate system is set into the display screen of the display 210, and the graph figure of the graph formula "$y=x+1$" and the graph figure of the graph formula "$y=x^2-2$" are displayed as the main figure Z1 and the sub figure Z2, respectively (Step S11).

Next, it is determined that there are coordinate calculation intersection points K (Step S12; YES), and then it is determined that coordinate values of the coordinate calculation intersection points K do not agree with the specific recognition accuracy "integer" (Step S13; NO), so that the main figure Z1 is displayed with a thin line (Step S16). In this action example, there are two coordinate calculation intersection points K, and coordinate values of one coordinate calculation intersection point K (not shown in FIG. 4B) on the right side (the side where the x coordinate value is larger) of the two coordinate calculation intersection points K are (2.30 . . . , 3.30 . . . ).

Figure 4C:
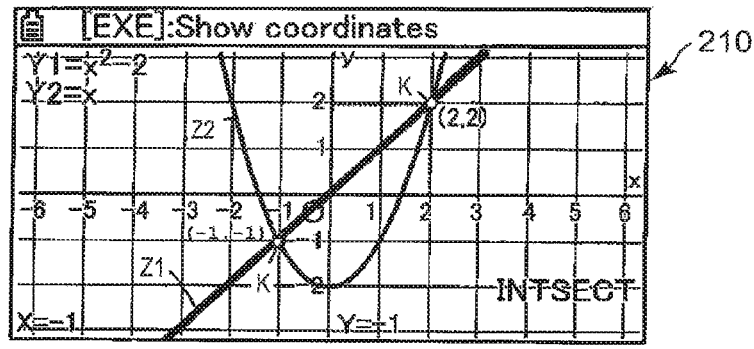

Next, when the user performs a movement operation on the main figure Z1, namely, drags the main figure Z1 while touching the main figure Z1 (Step S22; YES), as shown in FIG. 4C, the graph formula "$y=x$" of the main figure Z1 moved in the drag direction (down direction in this example) to the current touch point is calculated, and the displayed graph formula of the main figure Z1 is updated (Step S23).

Next, it is determined that the movement/transformation operation on the main figure Z1 has not finished yet (Step S30; NO), and the graph figure of the graph formula "$y=x$" and the graph figure of the graph formula "$y=x^2-2$" are displayed as the main figure Z1 and the sub figure Z2, respectively (Step S11).

Next, it is determined that there are coordinate calculation intersection points K (Step S12; YES), and then it is determined that coordinate values (−1, −1) and (2, 2) of the coordinate calculation intersection points K agree with the specific recognition accuracy "integer" (Step S13; YES), so that the main figure Z1 is prominently displayed with a thick line, and the graph figure (the graph figure of "y=x") which matches the current main figure Z1 is temporarily stored as a display candidate graph figure (Step S14). In addition, the coordinate values (−1, −1) and (2, 2) are displayed near their respective coordinate calculation intersection points K (Step S15).

Figure 4D:
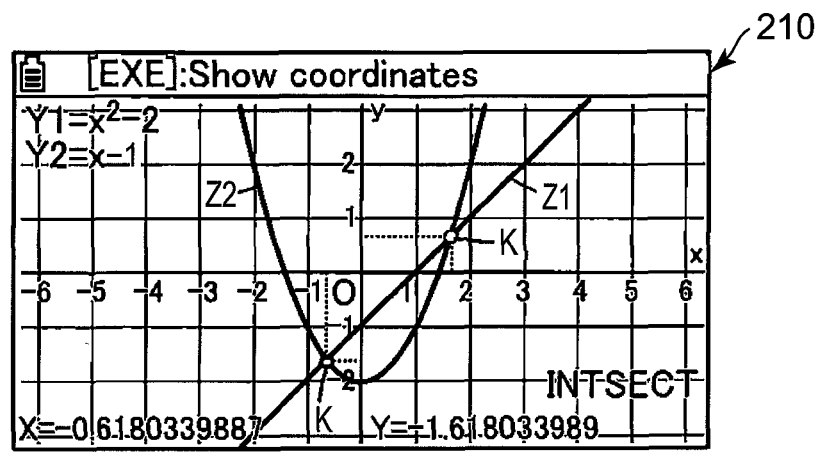

Next, when the user continues the movement operation on the main figure Z1 and then finishes the movement operation (Step S22; YES), as shown in FIG. 4D, the graph formula "y=x−1" of the main figure Z1 moved in the drag direction (down direction in this example) to the current touch point is calculated, and the displayed graph formula of the main figure Z1 is updated (Step S23).

Next, it is determined that the movement/transformation operation on the main figure Z1 has finished (Step S30; YES), and then it is determined that coordinate values of coordinate calculation intersection points K do not agree with the specific recognition accuracy "integer" (Step S31; NO). The coordinate values of the coordinate calculation intersection point K on the left side (the side where the x coordinate value is smaller) are (−0.61 . . . , −1.61 . . . ). Then, among a plurality of graph figures which match the main figure Z1 when the main figure Z1 continues to be moved, the graph figure (the graph figure of "y=x−2") which has intersection points with the sub figure Z2, coordinate values of the intersection point agreeing with the specific recognition accuracy "integer", and which matches the main figure Z1 immediately after the end of the movement operation is identified as a display candidate graph figure (Step S32).

Figure 4E:
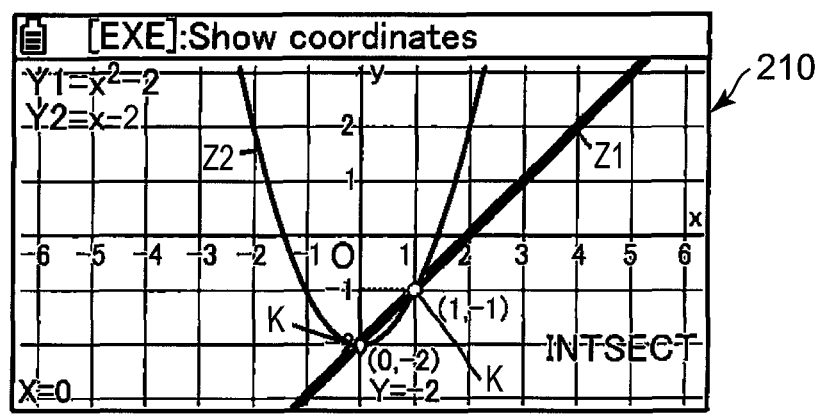

Next, the display candidate graph figure of the graph formula "y=x−2" is determined to be more similar to the main figure Z1 (the graph figure of "y=x−1") at the end of the movement operation than the temporarily-stored display candidate graph figure of the graph formula "y=x" is (Step S33), so that, as shown in FIG. 4E, the main figure Z1 is made to match the graph figure of the graph formula "y=x−2", and the displayed graph formula of the main figure Z1 is updated to the graph formula "y=x−2" (Step S34).

Then, the main figure Z1 is prominently displayed with a thick line, and the graph figure (the graph figure of "y=x−2") which matches the current main figure Z1 is temporarily stored as a display candidate graph figure (Step S14). In addition, the coordinate values (0, −2) and (1, −1) are displayed near their respective coordinate calculation intersection points K (Step S15).

4.2. Second Action Example

Figure 5A:
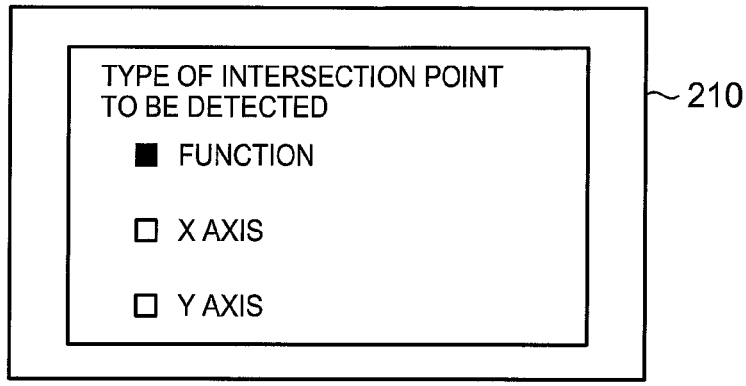
FIGS. 5A to 5D each show the display content on the display.
Figure 5B:
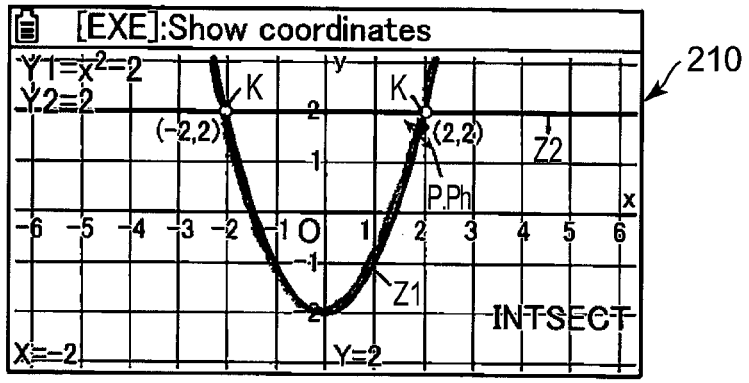

First, as shown in FIGS. 5A and 5B, when a user specifies "integer" as the recognition accuracy of coordinate values of coordinate calculation intersection points K (Step S1), specifies intersection points of a function graph figure and another function graph figure as the type of coordinate calculation intersection points K (Step S2) and inputs graph formulas "y=$x^2$−2" and "y=2" (Step S3), an xy coordinate system is set into the display screen of the display 210, and the graph figure of the graph formula "y=$x^2$−2" and the graph figure of the graph formula "y=2" are displayed as the main figure Z1 and the sub figure Z2, respectively (Step S11).

Next, it is determined that there are coordinate calculation intersection points K (Step S12; YES), and then it is determined that coordinate values (−2, 2) and (2, 2) of the coordinate calculation intersection points K agree with the specific recognition accuracy "integer" (Step S13; YES), so that the main figure Z1 is prominently displayed with a thick line, and the graph figure (the graph figure of "y=$x^2$−2") which matches the current main figure Z1 is temporarily stored as a display candidate graph figure (Step S14). In addition, the coordinate values (−2, 2) and (2, 2) are displayed near their respective coordinate calculation intersection points K (Step S15).

Figure 5C:
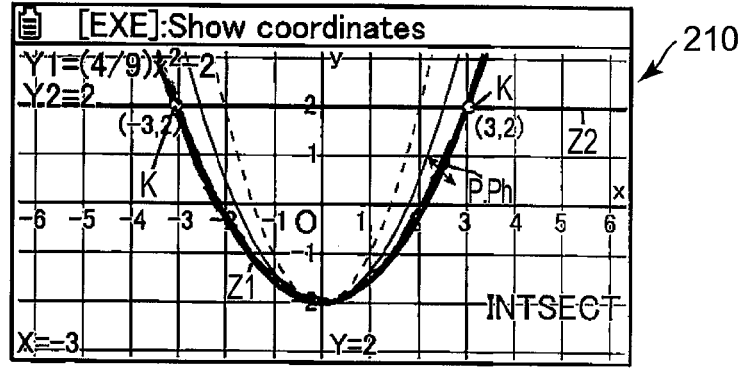

Next, when the user performs a transformation operation on the main figure Z1 (Step S21; YES, Step S22; NO), the main figure Z1 is determined to be line symmetry (Step S25; YES), and the shape of the pointer P changes to the shape which represents that the opening degree is changeable. Then, when the user performs a drag operation using the pointer P (opening degree pointer Ph), the shape of which has changed, from the point shown in FIG. 5B in the right direction, as shown in FIG. 5C, the graph formula "y=(4/9)$x^2$−2" of the main figure Z1 opened to the current touch point is calculated, and the displayed graph formula of the main figure Z1 is updated (Step S26).

Next, the graph figure of the graph formula "y=(4/9)$x^2$−2" and the graph figure of the graph formula "y=2" are displayed as the main figure Z1 and the sub figure Z2, respectively (Step S11). In FIG. 5C, the graph figure of the graph formula "y=$x^2$−2" input by the user is displayed with a broken line, and a graph figure in transformation is displayed with a thin solid line.

Next, it is determined that there are coordinate calculation intersection points K (Step S12; YES), and then it is determined that coordinate values (−3, 2) and (3, 2) of the coordinate calculation intersection points K agree with the specific recognition accuracy "integer" (Step S13; YES), so that the main figure Z1 is prominently displayed with a thick line, and the graph figure (the graph figure of "y=(4/9)$x^2$−2") which matches the current main figure Z1 is temporarily stored as a display candidate graph figure (Step S14). In addition, the coordinate values (−3, 2) and (3, 2) are displayed near their respective coordinate calculation intersection points K (Step S15).

Figure 5D:
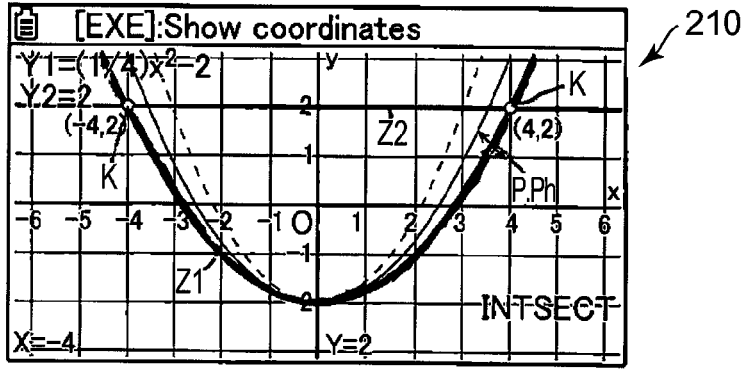

Next, when the user continues the transformation operation on the main figure Z1 (Step S21; YES, Step S22; NO) and accordingly continues the drag operation using the pointer P (opening degree pointer Ph), the shape of which has changed, in the right direction, as shown in FIG. 5D, the graph formula "y=(1/4)$x^2$−2" of the main figure Z1 opened to the current touch point is calculated, and the displayed graph formula of the main figure Z1 is updated (Step S26).

Next, the graph figure of the graph formula "y=(1/4)$x^2$−2" and the graph figure of the graph formula "y=2" are displayed as the main figure Z1 and the sub figure Z2, respectively (Step S11).

Next, it is determined that there are coordinate calculation intersection points K (Step S12; YES), and then it is determined that coordinate values (−4, 2) and (4, 2) of the coordinate calculation intersection points K agree with the specific recognition accuracy "integer" (Step S13; YES), so that the main figure Z1 is prominently displayed with a thick line, and the graph figure (the graph figure of "y=(1/4)$x^2$−2") which matches the current main figure Z1 is temporarily stored as a display candidate graph figure (Step S14). In addition, the coordinate values (−4, 2) and (4, 2) are displayed near their respective coordinate calculation intersection points K (Step S15).

4.3. Third Action Example

Figure 6A:
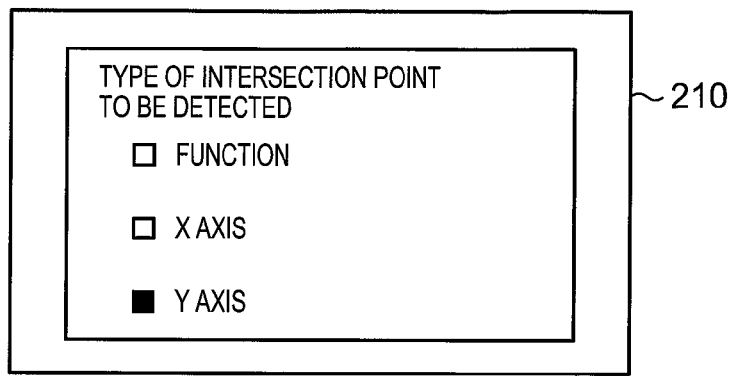
FIGS. 6A to 6D each show the display content on the display.
Figure 6B:
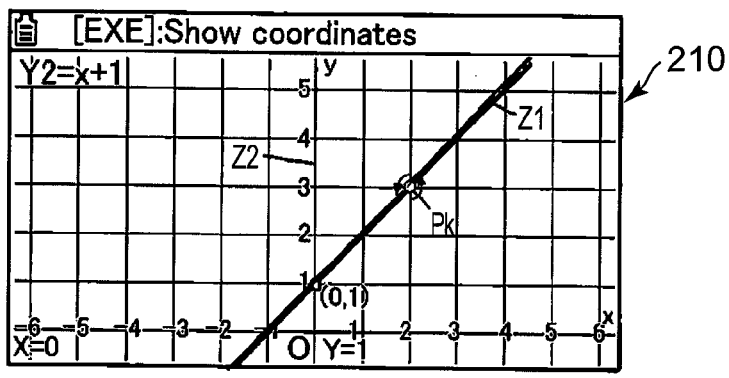

First, as shown in FIGS. 6A and 6B, when a user specifies "integer" as the recognition accuracy of coordinate values of coordinate calculation intersection points K (Step S1), specifies intersection points of a function graph figure and a y axis as the type of coordinate calculation intersection points K (Step S2) and inputs a graph formula "y=x+1" (Step S3), an xy coordinate system is set into the display screen of the display 210, and the graph figure of the graph formula "y=x+1" and the y axis are displayed as the main figure Z1 and the sub figure Z2, respectively (Step S11).

Next, it is determined that there is a coordinate calculation intersection point K (Step S12; YES), and then it is determined that coordinate values (0, 1) of the coordinate calculation intersection point K agree with the specific recognition accuracy "integer" (Step S13; YES), so that the main figure Z1 is prominently displayed with a thick line, and the graph figure (the graph figure of "y=x+1") which matches the current main figure Z1 is temporarily stored as a display candidate graph figure (Step S14). In addition, the coordinate values (0, 1) are displayed near the coordinate calculation intersection point K (Step S15).

Figure 6C:
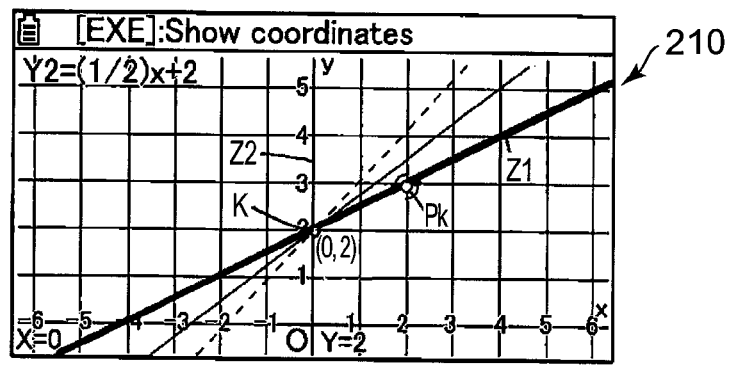

Next, when the user performs a transformation operation on the main figure Z1 (Step S21; YES, Step S22; NO), the main figure Z1 is determined not to be line symmetry (Step S25; NO), and the shape of the pointer P changes to the shape which represents that the figure is rotatable. Then, when the user performs a drag operation using the pointer P (rotation pointer Pk), the shape of which has changed, from the point shown in FIG. 6B in the down direction, as shown in FIG. 6C, the graph formula "y=(½)x+2" of the main figure Z1 rotated to the current touch point is calculated, and the displayed graph formula of the main figure Z1 is updated (Step S27).

Next, the graph figure of the graph formula "y=(½)x+2" and the y axis are displayed as the main figure Z1 and the sub figure Z2, respectively (Step S11). In FIG. 6C, the graph figure of the graph formula "y=x+1" input by the user is displayed with a broken line, and a graph figure in transformation is displayed with a thin solid line.

Next, it is determined that there is a coordinate calculation intersection point K (Step S12; YES), and then it is determined that coordinate values (0, 2) of the coordinate calculation intersection point K agree with the specific recognition accuracy "integer" (Step S13; YES), so that the main figure Z1 is prominently displayed with a thick line, and the graph figure (the graph figure of "y=(½)x+2") which matches the current main figure Z1 is temporarily stored as a display candidate graph figure (Step S14). In addition, the coordinate values (0, 2) are displayed near the coordinate calculation intersection point K (Step S15).

Figure 6D:
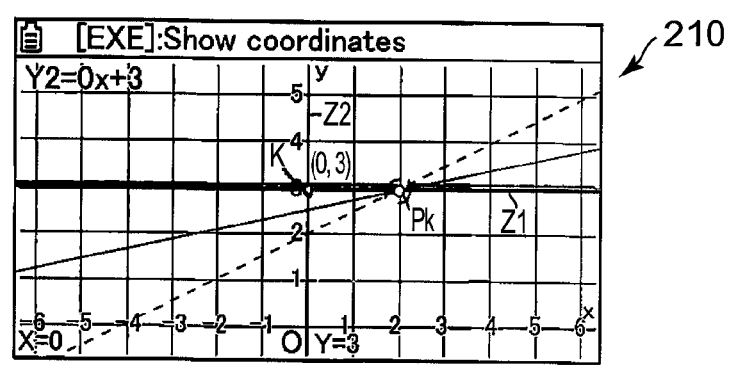

Next, when the user continues the transformation operation on the main figure Z1 (Step S21; YES, Step S22; NO) and accordingly continues the drag operation using the pointer P (rotation pointer Pk), the shape of which has changed, in the down direction, as shown in FIG. 6D, the graph formula "y=0x+3" of the main figure Z1 rotated to the current touch point is calculated, and the displayed graph formula of the main figure Z1 is updated (Step S27).

Next, the graph figure of the graph formula "y=0x+3" and the y axis are displayed as the main figure Z1 and the sub figure Z2, respectively (Step S11).

Next, it is determined that there is a coordinate calculation intersection point K (Step S12; YES), and then it is determined that coordinate values (0, 3) of the coordinate calculation intersection point K agree with the specific recognition accuracy "integer" (Step S13; YES), so that the main figure Z1 is prominently displayed with a thick line, and the graph figure (the graph figure of "y=0x+3") which matches the current main figure Z1 is temporarily stored as a display candidate graph figure (Step S14). In addition, the coordinate values (0, 3) are displayed near the coordinate calculation intersection point K (Step S15).

As described above, according to the embodiment of the present invention, as shown in FIGS. 3 (Steps S13, S14 and S31), 4A to 6D and the like, when the main figure Z1 is moved or transformed in the coordinate system in response to a user operation, an intersection point(s) of the main figure Z1 and the sub figure Z2 is detected as a coordinate calculation intersection point(s) K, and coordinate values thereof are calculated. Then, the main figure Z1 is prominently displayed when the calculated coordinate values are integers (or decimals expressed to the $n^{th}$ decimal place as true values). Thus, the main figure Z1 can be moved or transformed in such a way that coordinate values of coordinate calculation intersection points K are integers (or decimals expressed to the $n^{th}$ decimal place as true values). Therefore, it is possible to move or transform a graph and study the graph in relation to coordinate values of intersection points of the graph and another figure.

Further, as shown in FIGS. 3 (Steps S23, S26 and S27), 4A to 6D and the like, the graph formula of the main figure Z1 moved or transformed is calculated and displayed. Therefore, the learning effect of a graph when the graph is studied in relation to coordinate values of intersection points of the graph and another figure can be increased.

Further, as shown in FIG. 3 (Step S15), 4A to 6D and the like, when the calculated coordinate values are integers (or decimals expressed to the $n^{th}$ decimal place as true values), the coordinate values are displayed. Therefore, coordinates of intersection points can be accurately found, and accordingly the learning effect of a graph when the graph is studied in relation to coordinate values of intersection points of the graph and another figure can be further increased.

Further, as shown in FIG. 3 (Steps S14 and S32 to S35), FIGS. 4A to 6D and the like, when the coordinate values calculated at the end of the user operation to move or transform the main figure Z1 are not integers (or decimals expressed to the $n^{th}$ decimal place as true values), among a plurality of function graph figures which match the main figure Z1 when the main figure Z1 continues to be moved or transformed, the function graph figure which has an intersection point (s) with the sub figure Z2, coordinate values of the intersection point being integers (or decimals expressed to the $n^{th}$ decimal place as true values), and which is most similar to the main figure Z1 at the end of the user operation is identified, and the main figure Z1 is moved or transformed to match the identified function graph figure. Thus, the main figure Z1 can be moved or transformed in such a way that coordinate values of a coordinate calculation intersection point (s) K are integers (or decimals expressed to the $n^{th}$ decimal place as true values). Therefore, user's trouble by trial and error in moving or transforming the main figure Z1 in such a way that coordinate values of a coordinate calculation intersection point (s) K are integers (or decimals expressed to the $n^{th}$ decimal place as true values) can be saved, and accordingly the learning effect of a graph when the graph is studied in relation to coordinate values of intersection points of the graph with another figure can be further increased.

It is needless to say that the detailed configuration and action of each component of the graph display apparatus 1 of the embodiment can be appropriately modified without departing from the scope of the present invention.

Figure 1B:
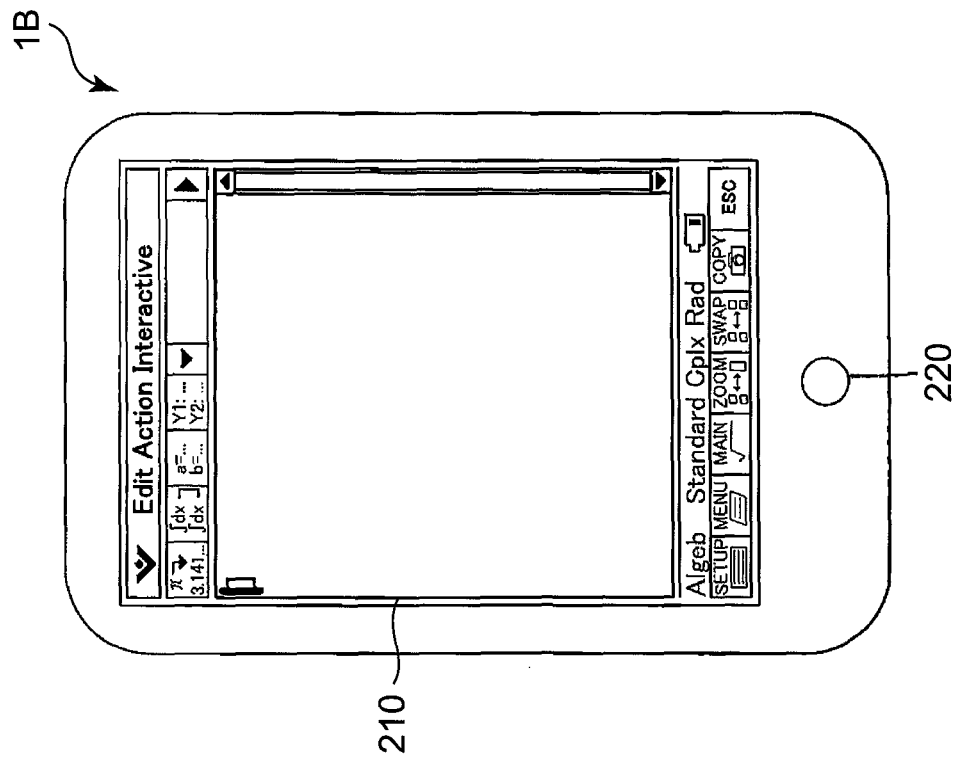
FIG. 1B is a plan view of a tablet personal computer.

For example, in the above, the graph display control apparatus of the present invention is described as the graph display apparatus 1. However, the present invention is not limited thereto and hence applicable to electronic devices in general such as a scientific electronic calculator, an electronic dictionary, a mobile phone, a personal computer, a PDA (Personal Digital Assistant), a game machine, and in particular, a tablet personal computer 1A shown in FIG. 1B. Further, the graph display control program 240 of the present invention may be stored in a memory card, a CD or the like attachable/detachable to/from the graph display apparatus 1.

Further, in the above, the vertical axis and the horizontal axis of the coordinate system are the Y axis and the X axis, respectively. However, coordinate axes of other names may be used. Further, in the above, the coordinate system is the Cartesian coordinate system. However, another type of coordinate system such as an oblique coordinate system or a polar coordinate system may be used. Further, in the above, the number of axes of the coordinate system is two. However, the number of axes may be three or more.

Further, in the above, when the coordinate values calculated at the end of the user operation to move or transform the main figure Z1 (movement/transformation operation) do not agree with the specific recognition accuracy, one of the display candidate graph figure identified at Step S32 and the display candidate graph figure temporarily stored at Step S14 is identified, the one being more similar to the main figure Z1 at the end of the movement/transformation operation. The display candidate graph figure identified at Step S32 is, among a plurality of function graph figures which match the main figure Z1 when the main figure Z1 continues to be moved or transformed, the function graph figure which has an intersection point(s) with the sub figure Z2, coordinate values of the intersection point agreeing with the specific recognition accuracy, and which matches the main figure Z1 immediately after the end of the movement/transformation operation. The display candidate graph figure temporarily stored at Step S14 is, among a plurality of function graph figures which match the main figure Z1 when the main figure Z1 is moved or transformed, the function graph figure which has an intersection point(s) with the sub figure Z2, coordinate values of the intersection point agreeing with the specific recognition accuracy, and which matches the main figure Z1 immediately before the end of the movement/transformation operation. Then, the main figure Z1 is moved or transformed to match the identified display candidate graph figure. However, the main figure Z1 may be moved or transformed only to match the display candidate graph figure identified at Step S32 or only to match the display candidate graph figure temporarily stored at Step S14.

In the above, several embodiments or the like of the present invention are described. However, the scope of the present invention is not limited thereto and hence includes the scope of claims attached below and the scope of equivalents.

What is claimed is:

1. A graph display control apparatus comprising:
a display unit; and
a CPU which is configured to perform control to:
set a coordinate system on the display unit, and display on the coordinate system on the display unit (i) a first graph figure, and (ii) a coordinate axis or a second graph figure;
specify the first graph figure when detecting a specification operation by a user to specify the first graph figure;
move or transform the first graph figure in a given direction in the coordinate system when detecting a movement or transformation operation by the user to move or transform the first graph figure in the given direction;
prominently display the moved or transformed first graph figure when it is determined that a first coordinate value of an intersection point of (i) the moved or transformed first graph figure, and (ii) the coordinate axis or the second graph figure, contains an integer;
when detecting a movement or transformation finish operation by the user to finish moving or transforming the first graph figure, determine whether or not a second coordinate value of an intersection point of (i) the moved or transformed first graph figure at a time of the detection of the movement or transformation finish operation, and (ii) the coordinate axis or the second graph figure, contains an integer;
when it is determined that the second coordinate value contains no integer, determine whether or not any of a plurality of coordinate values of intersection points of (i) plural tentative first graph figures obtained while moving or transforming the first graph figure while the movement or transformation operation continues in the same direction, and (ii) the coordinate axis or the second graph figure, contain an integer;
when it is determined that any of the plurality of coordinate values contain the integer, identify, from among the plural tentative first graph figures, one or more tentative first graph figures which respectively have coordinate values each determined to contain the integer;
identify, from among the identified one or more tentative first graph figures, a graph figure which is most similar to the first graph figure at the time of the detection of the movement or transformation finish operation, as a third graph figure; and
correct the first graph figure at the time of the detection of the movement or transformation finish operation to match the third graph figure.

2. The graph display control apparatus according to claim 1, wherein the CPU is further configured to perform control to:
store the prominently displayed first graph figure; and
when it is determined that none of the plurality of coordinate values contain the integer, correct the first graph figure at the time of the detection of the movement or transformation finish operation to match the stored first graph figure.

3. The graph display control apparatus according to claim 1, wherein the CPU is further configured to perform control to input one or more graph formulas based on a user operation, and
wherein the CPU controls to display on the coordinate system on the display unit (i) a graph figure corresponding to one of the input graph formulas as the first graph figure, and (ii) the coordinate axis or a graph figure corresponding to another one of the input graph formulas as the second graph figure.

4. The graph display control apparatus according to claim 1, the CPU is further configured to perform control to:
display a pointer on a display screen of the display unit and move the pointer in response to a user operation;
when the pointer is moved to a predetermined point on the first graph figure, change a shape of the pointer according to a type of the first graph figure to a different shape which represents a mode of transformation to be performed on the first graph figure; and transform the first graph figure in response to the user operation using the pointer having the different shape.

5. The graph display control apparatus according to claim 1, wherein the CPU is further configured to perform control to prominently display the moved or transformed first graph figure when it is determined that the first coordinate value is expressed as a true value within a decimal of a predetermined number of decimal places or less, wherein the predetermined number is specified through a user operation.

6. The graph display control apparatus according to claim 1, wherein the CPU is further configured to perform control to display the first coordinate value when it is determined that the first coordinate value contains the integer.

7. The graph display control apparatus according to claim 1, further comprising a touch panel, wherein:
the specification operation is a touch operation performed by the user on the touch panel to specify the first graph figure,
the movement or transformation operation is a touch operation performed by the user on the touch panel to move or transform the first graph figure, and
the movement or transformation finish operation is an end of the touch operation performed by the user on the touch panel to move or transform the first graph figure.

8. The graph display control apparatus according to claim 1, wherein the prominent display of the first guide figure is display of the first guide figure in a display mode which is different from a display mode in which the first graph figure is displayed when it is determined that the first coordinate value does not contain the integer.

9. A graph display control method comprising:
setting a coordinate system on a display unit, and displaying on the coordinate system on the display unit (i) a first graph figure, and (ii) a coordinate axis or a second graph figure;
specifying the first graph figure when detecting a specification operation by a user to specify the first graph figure;
moving or transforming the first graph figure in a given direction in the coordinate system when detecting a movement or transformation operation by the user to move or transform the first graph figure in the given direction;
prominently displaying the moved or transformed first graph figure when it is determined that a first coordinate value of an intersection point of (i) the moved or transformed first graph figure, and (ii) the coordinate axis or the second graph figure, contains an integer;
when detecting a movement or transformation finish operation by the user to finish moving or transforming the first graph figure, determining whether or not a second coordinate value of an intersection point of (i) the moved or transformed first graph figure at a time of the detection of the movement or transformation finish operation, and (ii) the coordinate axis or the second graph figure, contains an integer;
when it is determined that the second coordinate value contains no integer, determining whether or not any of a plurality of coordinate values of intersection points of (i) plural tentative first graph figures obtained while moving or transforming the first graph figure while the movement or transformation operation continues in the same direction, and (ii) the coordinate axis or the second graph figure, contain an integer;
when it is determined that any of the plurality of coordinate values contain the integer, identifying, from among the plural tentative first graph figures, one or more tentative first graph figures which respectively have coordinate values each determined to contain the integer;
identifying, from among the identified one or more tentative first graph figures, a graph figure which is most similar to the first graph figure at the time of the detection of the movement or transformation finish operation, as a third graph figure; and
correcting the first graph figure at the time of the detection of the movement or transformation finish operation to match the third graph figure.

10. The graph display control method according to claim 9, further comprising:
storing the prominently displayed first graph figure; and
when it is determined that none of the plurality of coordinate values contain the integer, correcting the first graph figure at the time of the detection of the movement or transformation finish operation to match the stored first graph figure.

11. The graph display control method according to claim 9, further comprising:
inputting one or more graph formulas based on a user operation; and
displaying on the coordinate system on the display unit (i) a graph figure corresponding to one of the input graph formulas as the first graph figure, and (ii) the coordinate axis or a graph figure corresponding to another one of the input graph formulas as the second graph figure.

12. The graph display control method according to claim 9, further comprising:
displaying a pointer on a display screen of the display unit and moving the pointer in response to a user operation;
when the pointer is moved to a predetermined point on the first graph figure, changing a shape of the pointer according to a type of the first graph figure to a different shape which represents a mode of transformation to be performed on the first graph figure; and
transforming the first graph figure in response to the user operation using the pointer having the different shape.

13. The graph display control method according to claim 9, further comprising prominently displaying the moved or transformed first graph figure when it is determined that the first coordinate value is expressed as a true value within a decimal of a predetermined number of decimal places or less, wherein the predetermined number is specified through a user operation.

14. The graph display control method according to claim 9, further comprising displaying the first coordinate value when it is determined that the first coordinate value contains the integer.

15. The graph display control method according to claim 9, wherein:
the specification operation is a touch operation performed by the user on a touch panel to specify the first graph figure,
the movement or transformation operation is a touch operation performed by the user on the touch panel to move or transform the first graph figure, and
the movement or transformation finish operation is an end of the touch operation performed by the user on the touch panel to move or transform the first graph figure.

16. The graph display control method according to claim 9, wherein the prominent display of the first guide figure is display of the first guide figure in a display mode which is different from a display mode in which the first graph figure is displayed when it is determined that the first coordinate value does not contain the integer.

17. A non-transitory computer-readable storage medium having stored thereon a graph display control program for a computer including a display unit, the graph display control program causing the computer to perform functions comprising:

setting a coordinate system on the display unit, and displaying on the coordinate system on the display unit (i) a first graph figure, and (ii) a coordinate axis or a second graph figure;

specifying the first graph figure when detecting a specification operation by a user to specify the first graph figure;

moving or transforming the first graph figure in a given direction in the coordinate system when detecting a movement or transformation operation by the user to move or transform the first graph figure in the given direction;

prominently displaying the moved or transformed first graph figure when it is determined that a first coordinate value of an intersection point of (i) the moved or transformed first graph figure, and (ii) the coordinate axis or the second graph figure, contains an integer;

when detecting a movement or transformation finish operation by the user to finish moving or transforming the first graph figure, determining whether or not a second coordinate value of an intersection point of (i) the moved or transformed first graph figure at a time of the detection of the movement or transformation finish operation, and (ii) the coordinate axis or the second graph figure, contains an integer;

when it is determined that the second coordinate value contains no integer, determining whether or not any of a plurality of coordinate values of intersection points of (i) plural tentative first graph figures obtained while moving or transforming the first graph figure while the movement or transformation operation continues in the same direction, and (ii) the coordinate axis or the second graph figure, contain an integer;

when it is determined that any of the plurality of coordinate values contain the integer, identifying, from among the plural tentative first graph figures, one or more tentative first graph figures which respectively have coordinate values each determined to contain the integer;

identifying, from among the identified one or more tentative first graph figures, a graph figure which is most similar to the first graph figure at the time of the detection of the movement or transformation finish operation, as a third graph figure; and correcting the first graph figure at the time of the detection of the movement or transformation finish operation to match the third graph figure.

18. The non-transitory computer-readable storage medium according to claim 17, the program further causing the computer to perform functions comprising:

storing the prominently displayed first graph figure; and when it is determined that none of the plurality of coordinate values contain the integer, correcting the first graph figure at the time of the detection of the movement or transformation finish operation to match the stored first graph figure.

19. The non-transitory computer-readable storage medium according to claim 17, the program further causing the computer to perform functions comprising:

inputting one or more graph formulas based on a user operation; and displaying on the coordinate system on the display unit (i) a graph figure corresponding to one of the input graph formulas as the first graph figure, and (ii) the coordinate axis or a graph figure corresponding to another one of the input graph formulas as the second graph figure.

20. The non-transitory computer-readable storage medium according to claim 17, the program further causing the computer to perform functions comprising:

displaying a pointer on a display screen of the display unit and moving the pointer in response to a user operation;

when the pointer is moved to a predetermined point on the first graph figure, changing a shape of the pointer according to a type of the first graph figure to a different shape which represents a mode of transformation to be performed on the first graph figure; and transforming the first graph figure in response to the user operation using the pointer having the different shape.

21. The non-transitory computer-readable storage medium according to claim 17, the program further causing the computer to perform a function comprising prominently displaying the moved or transformed first graph figure when it is determined that the first coordinate value is expressed as a true value within a decimal of a predetermined number of decimal places or less, wherein the predetermined number is specified through a user operation.

22. The non-transitory computer-readable storage medium according to claim 17, the program further causing the computer to perform a function comprising displaying the first coordinate value when it is determined that the first coordinate value contains the integer.

* * * * *